Dec. 8, 1925.                                              1,564,924
                    L. ALWYN
MANUFACTURE OF MOLDS FOR MAKING CONCRETE OR LIKE BEAMS, BLOCKS,
                COLUMNS, AND THE LIKE
        Filed March 10, 1923        2 Sheets-Sheet 1
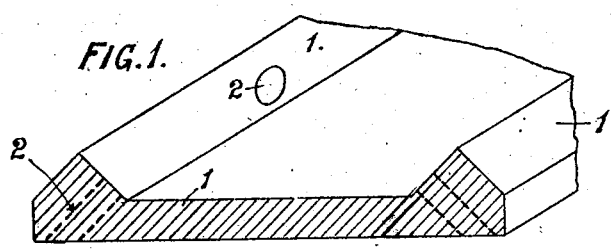
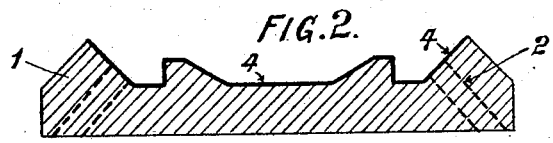
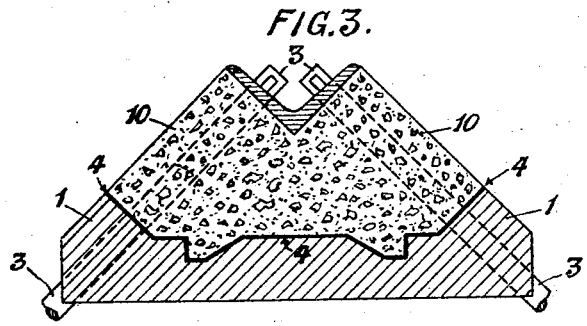
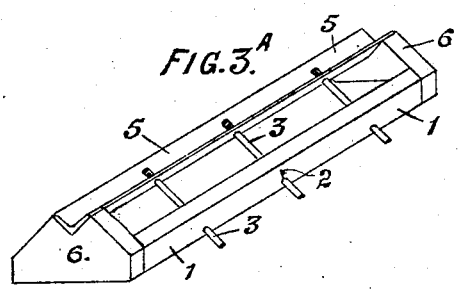
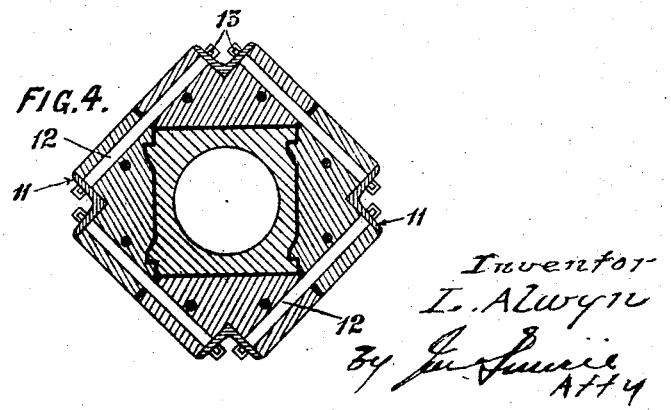
Inventor
L. Alwyn
By [signature]
     Atty Dec. 8, 1925.   1,564,924
L. ALWYN
MANUFACTURE OF MOLDS FOR MAKING CONCRETE OR LIKE BEAMS, BLOCKS, COLUMNS, AND THE LIKE
Filed March 10, 1923    2 Sheets-Sheet 2
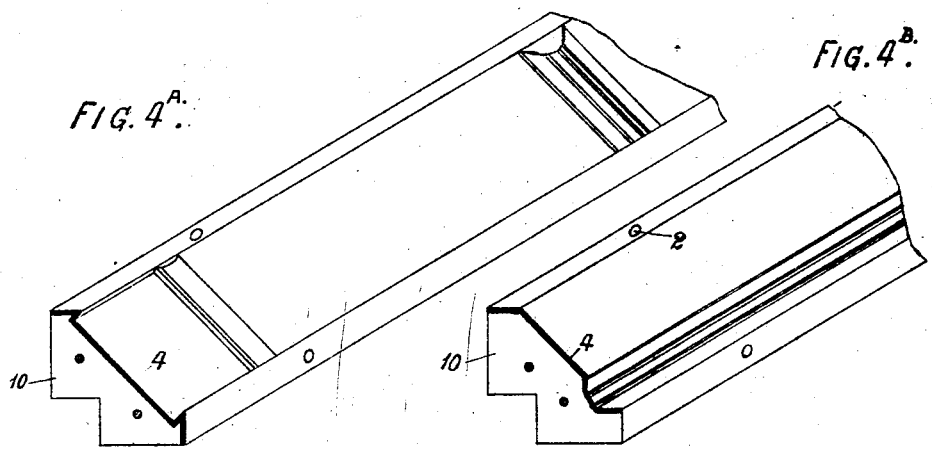
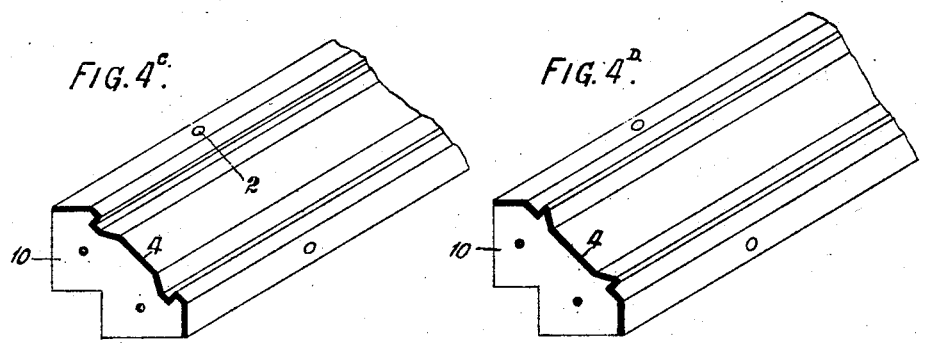
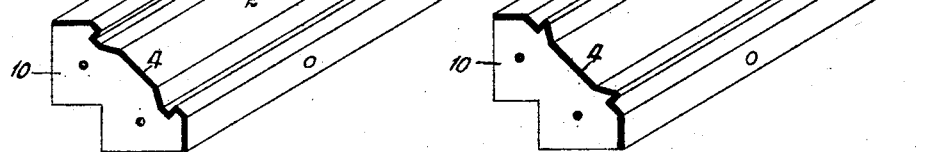
Inventor
L. Alwyn Patented Dec. 8, 1925.

1,564,924

UNITED STATES PATENT OFFICE.

LUIS ALWYN, OF LONDON, ENGLAND.

MANUFACTURE OF MOLDS FOR MAKING CONCRETE OR LIKE BEAMS, BLOCKS, COLUMNS, AND THE LIKE.

Application filed March 10, 1923. Serial No. 624,263.

*To all whom it may concern:*

Be it known that I, LUIS ALWYN, a subject of the King of England, and residing at Notting Hill Gate, London, England, have invented Improvements in and Connected with the Manufacture of Molds for Making Concrete or like Beams, Blocks, Columns, and the like, of which the following is a specification.

This invention has reference to molds for molding and making concrete bodies or articles of cement or mortar concrete or the like therein, but more especially by the spinning method.

In the methods or manner of making molds and in the molds and the manufacture of bodies therein as hereinafter described, the improvements under this invention are comprised.

The molds are made of concrete, papier mâché, or like plastic or loose or soft material or composition which sets hard, in a plurality of parts or sections, as for instance four parts, where a polysided figure is to be made; and each of these parts or sections is made by molding same in a solid matrix mold, truly made of such form and size that the several sections or parts when assembled will meet and lie in close contact, whilst the molding surfaces of the several sections not in contact which will form the external figure or shape of the article to be produced, (the simplest form of which will be rectangular) will, as regards main dimensions and angles, be true and identical; resulting in the body produced as regards main dimensions and angles, exactness and truth.

Further, the meeting and molding surfaces and the molding or working faces, of the concrete or like mold sections are coated or faced with metal, such as copper or other non-corrodible metal in the manner hereinafter explained.

In the making of molds under this invention, a single matrix is used for making a plurality of—in some cases all—the mold sections used to form the complete mold for molding and making the bodies or articles; but in the case where the body of the article to be produced has difficult formations or features, or different sides or parts of it, and the molding or working surfaces of the mold sections are to be accordingly furnished with different formations or features, there will be different matrix molds used, or a matrix mold with removable or interchangeable molding parts, and the matrix mold or removable part of the matrix molds will be provided with the formations or features which it is desired to reproduce in the body of the article to be made. These formations or features will either be cut or otherwise formed in a permanent manner in or on the substance of the matrix molds, or be formed by affixing to the matrix mold separate and detachable moldings, projections and the like.

The metal facing plates which are to form the active or working surfaces of the mold sections may be readily formed by electrically depositing copper or other suitable metal on the working surface of the matrix mold or molds, which may be advantageously made of slate or like material planed or fashioned exactly to the shape required and rendered true and smooth, the angles being also true, and flat surfaces truly flat.

Complete identity is thus ensured by making every mold section an exact reproduction in general dimensions and form of either one matrix mold or alternatively of more than one matrix mold, all of which are planed or fashioned to precisely identical general dimensions or form.

The working face of the matrix mold is made conductive to electricity in any known way, and the matrix mold is immersed in a copper or metal depositing electrolyte, so that the working face is coated with copper or metal to any desired thickness by electrolysis.

This metallic coating is an exact negative of the working face of the matrix.

Into the matrix mold and onto the upper or inner surface of the metal face plate, the concrete or other material of the kind referred to of which the main body of the mold sections are to be made, is introduced, and formed of the shape or form required.

The mold section faces will thus be covered with a metal face, and of a kind which is smooth, and to which, when greased as usual, the concrete which is molded in the mold, will not adhere, that is will readily part when the molded body or article is removed; but to ensure the mold section concrete or the like adhering to the inside surface of the metal face, it is provided on its inner surface with keying or connecting pieces or provisions, which will become surrounded by or become firmly keyed in the concrete. These keying means may be effected simply by attaching keying pieces to the inside surface of the metal plate, or by pouring molten metal as spelter, zinc, or the like or bitumen, pitch, or other adhesive material on to the inner surface of the metal face, thus forming irregular projecting pieces to which the concrete or other material will key itself.

In the case of the mold being in four parts, say for making a body of rectangular form, each mold section will have three surfaces, all of which are provided with a metal face, namely, a central one which is to form one of the surfaces of the body, to be molded and produced, and two wing surfaces, lying at 135° to the face, and forming the surfaces in contact with which the adjacent mold sections come, forming a tight metallic joint, and all the sections being molded in a single matrix or exactly similar matrices—which are truly of the size and shape required—all the mold sections when placed together will fit truly together, and no cement or liquid can pass between the joints, and the angles and dimensions of the surfaces of the body will be true and accurate.

The bodies of concrete or the like made under this invention, are not injured or defective at the angles or other parts, as by being molded in the molds of the form or construction herein described, they part with the mold surfaces and are removed therefrom without being injured or defective as stated.

In the matrix mold surfaces, the parts which are to mold or form projecting or recessed features in the body produced, will be projections or recesses, respectively,—i. e. positives; as for instance when the bodies produced are to fit and register with one another at their opposite or other faces, the matrix mold for producing the projecting features on the body will be provided with projections thereon, and on the matrix mold for forming the surface with recesses, recesses will be provided in its surface; and the matrix molds being made to exactly fit each other, and the mold sections being made as described, the projections on the surface of one body will fit and coincide exactly with the recesses on the other; and the surfaces of any two other adjacent bodies will in a building or erection, be flush and true. When this manner of engaging and registering one body with another is applied to building constructions, the engaging provisions or parts may consist of rectilinear projections at each side of the building body, having one face, say the outer face, at right angles to the surface of the body, and the other curved or inclined; while the recesses or grooves in the opposite or other surface will be correspondingly formed and placed; and the projections and recesses in the matrix molds will be correspondingly formed.

With regard to the manufacture of the metal mold faces from sheet or thin metal produced by pressing same mechanically into the form or configuration required, as by rolling or stamping, this method may be adopted where suitable, as for instance in the case of forming simple projections and recesses on faces of the mold sections; but at the same time, this manner of manufacture can also be employed in some cases where other kinds of formations or provisions are required.

In the making of the metal plates for the mold sections by electrically depositing the metal on the matrix mold used in the case where projections are to be formed on the metal face, or under similar circumstances, the matrix mold may be made in several sections, one or more of which may be readily removable so as to free or loosen the parts of the face plate which lie in the recesses on the plaque.

This invention is especially applicable to the manufacture of bodies by the spinning process, and can be used advantageously generally in the manufacture of bodies such as beams, blocks, columns, and the like, for use in building construction or other purpose, whether the bodies be solid or hollow; and in the case of their being hollow, when the spinning method is not adopted, the hollow portions may be formed by solid cores within the mold, which of course are not required when the spinning method is employed.

The invention will be further described in connection with the accompanying drawings which illustrate it, and of which Figure 1 represents a perspective view and section of a plain matrix mold, and Figures 2 and 3 are sections of matrices for making female and male molds, respectively, and showing the metal plates and concrete in position. Figure 3$^a$ is a perspective view of the matrix mold shown in the above figures, with parts used in connection with same for making or forming the working or mold sections of the complete mold for making the articles to be produced.

Figure 4 shows a complete mold comprised of four mold sections of concrete, and a hollow column or body of concrete formed within it, say.

Figures 4$^A$, 4$^B$, 4$^C$ and 4$^D$ show various forms of mold sections; and Figure 5 shows roofing beams with interlocking and bolting means according to this invention.

In the drawings, 1 shows the matrix mold, formed in the shape shown, and having holes 2 for the passage through it of bolts or rods 3, for the purposes hereinafter described.

The metal facing plates are marked 4, and have holes through them for the passage of the bolts or rods 3.

The complete matrix mold for making ultimate mold sections for making the concrete or like articles, is shown in Figure 3$^A$, and has at each end, blocks 6 which stop the ends of the matrix mold, and support in the notch at the top of same, the angle bar 5 which is held in position relatively to the matrix by the rods 3, as shown, fitting and held in holes in the matrix and in the angle bar. The inclined edges of the matrix, the blocks 6 and the edges of the angle bar are all in the same plane, which lies at an angle of 45°, and into the space within these parts, the concrete or material to form the body of the mold section or member is introduced; and the bolts or bars 3 forming cores for forming holes in the concrete or like section, through which the bolts 12 which hold the sections of the complete mold shown in Figure 4 together.

In making a mold section and filling it in with concrete 10, by the employment of the angle bar 5 at the top of the mold, a deep V channel will be formed along the length of the concrete backing, and bolt holes are formed by the bars 3 completely through the backing; and this channel and the bolt holes enable a stout steel angle bar 11 to be placed in the channel and strong bolts 12 to be passed through the bolt holes in the concrete, and in the angle bars, in such a manner as to fasten the four sections or members tightly together by means of wedge shaped cotter pins 13 driven through holes in the ends of the bolts 12, and bearing tightly with a wedging action against the flanges of the angle bars.

The four sections thus made and assembled produce a complete mold of great rigidity, and of any strength in case of its being used in the spinning method required to withstand without distortion the strains set up in the mold during the process of spinning the concrete within the molds for the formation of hollow columns or other articles to be produced.

All sections being identical in their cross sectional dimension, any sections required can be used, and they can be assembled in any desired order.

The only skilled craftsmanship necessary is in the making of the matrix or matrices of slate or like material, the cost of which can be spread over any number of reproductions, and again over any number of beams.

In making the mold sections or members, the outer faces of the concrete will be struck and made flat and fair with the angular edges of the matrix mold, and the edges of the upper angle bar.

For making columns, beams, or bodies, one face of which will form the inside wall surface of a room, on which moldings, skirtings, dado or other features, as represented in Figures 4$^A$ to 4$^D$, are to be provided, the working face of one mold section will be provided with recesses of the required form; and these will extend transversely across the mold face or faces; or lengthwise as the case may be; and when such features or provisions on the produced bodies are moldings, skirtings, dadoes, or the like, and the columns or bodies are placed side by side, the projecting features throughout a wall, present a continuous formation or true alignment.

The metal surface plates 4 will be of the form required, such as indicated in Figures 4$^A$ to 4$^D$ of the drawings, or made plain according to the surface to be produced on any particular part of the finished work; the outer angles of the outside surfaces of the plates 4 which come in contact with each other, will be 135° from the bottom surface, so that the parts of the sections of the concrete or like molds which come in contact with each other will correspond, and produce a column or article of true rectangular form and size.

Through the mold sections being all formed from one common matrix or identical matrices, the mold sections will be identical in general dimension, and form, and angles, and they can be assembled to form the complete mold in any relative order desired, and to produce different formations on the several faces as may be required; and in the case of a rectangular beam to be used as a portion of a house wall, one face of the beam would form a portion of the internal side of the wall, and may have a skirting and dado rail section on it, as indicated in Figure 4$^A$, and the face parallel to it would form a portion of the external wall face, and may have a plain or smooth surface; whilst the two other opposite surfaces will be of male and female section as shown in Figures 4$^C$ and 4$^D$.

In other cases for making horizontal columns, one of the mold sections may have the form as illustrated in Figure 4$^B$.

With regard to the roofing beam construction shown in Figure 5, in this case the articles made in the mold will be in halves, that is instead of complete rectangular columns being made as in the case set forth with reference to Figure 4, on the two opposite plaques 4 on the mold sections, there will be a division strip extending radially inwards towards the centre and running the whole length of the mold, so that the concrete or material in the mold forming the finished article will be divided by these division strips, and the two half columns can be separated by means of same, and form the beams shown in Figure 5.

In this case and in other where desired, the beams or bodies formed in the molds may have steel reinforcement rods 13× set in them by placing such rods in suitable positions in the molds before introducing the concrete; the rods are thus embedded in the concrete forming the beams.

In order to form the holes in the beams required to permit of the tie bolts 14, metal cores are placed in the mold section in an inwardly projecting direction which produce the required holes. Through these holes the tie bolts 14 are passed running in a direction at right angles to the beams so that the beams are clamped and held tightly together.

In these roofing beams it is also seen that the meeting faces are made with ledges, so that the overhanging ledge of one side fits over the projecting lower ledge or parts of the adjacent beam, and so a weather and watertight joint is made, besides the blocks being keyed to one another, and registered in the required position, the adjacent lower edges of the beams being flush.

In other work, as in walls above described, all the beams produced will be identical in cross sectional dimensions, and the position and dimensions of interlocking or registering members, and of any moldings such as cornices, skirtings and the like, will be identical; while exactitude of the angles is also produced.

While the invention has been described more especially as applied to the making of bodies or columns of cement concrete or mortar concrete or the like, they may be applied to making articles of any material which can be formed into a solid state; and the molds may be adapted to make two articles as described or a multiplicity of articles, separate or separable, in the single mold, the method of multiplication of manufacture of the molds from an original matrix mold above described being employed.

In the case of the mold sections or members being made chiefly of concrete or similar material of small tensile strength, even if reinforced by metal rods or the like passed through them, they should be carried in suitable steel cradle or frame work, which is sufficiently rigid to resist all strains and torque set up during spinning.

What is claimed is:—

1. The herein described method of making sectional molds for the formation of columns or bodies, consisting in providing a mold matrix of a shape to accurately mold a particular section of the completed mold, and providing said matrix with a metal face to form the molding face of the mold section, and molding the section in said matrix to utilize said plate as a facing for said section when removed from the matrix.

2. A mold for making columns or bodies of plastic material, comprising a plurality of sections having metallic face portions forming in part a portion of the article to be molded and in part a meeting edge with an adjacent mold section, and means for securing the mold section in mold forming relation beyond their article forming faces.

3. A method of manufacturing molds for molding articles, consisting in forming said molds in a matrix mold and upon a metal face plate resting in said matrix mold, the matrix mold forming said mold to provide a molding face and the angle portions to connect said mold with similar mold sections, the metal face plate fitting the molding face and angles of said mold.

In testimony whereof I have signed my name to this specification.

LUIS ALWYN.